(12) United States Patent
Heseding et al.

(10) Patent No.: US 12,116,059 B2
(45) Date of Patent: Oct. 15, 2024

(54) TRAILER VEHICLE AND TRAILER BRAKE CONTROLLER, AND METHOD AND COMPUTER PROGRAM PRODUCT THEREFOR

(71) Applicant: ZF CV Systems Hannover GmbH, Hannover (DE)

(72) Inventors: Johannes Heseding, Hannover (DE); Gerd Schuenemann, Laatzen (DE); Jan Reiners, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 509 days.

(21) Appl. No.: 17/419,302

(22) PCT Filed: Dec. 17, 2019

(86) PCT No.: PCT/EP2019/085469
§ 371 (c)(1),
(2) Date: Jun. 29, 2021

(87) PCT Pub. No.: WO2020/141065
PCT Pub. Date: Jul. 9, 2020

(65) Prior Publication Data
US 2022/0097786 A1     Mar. 31, 2022

(30) Foreign Application Priority Data
Jan. 2, 2019   (DE) ............... 10 2019 100 017.3

(51) Int. Cl.
*B60T 8/17* (2006.01)
*B60D 1/62* (2006.01)
(Continued)

(52) U.S. Cl.
CPC ............... *B62D 59/04* (2013.01); *B60D 1/62* (2013.01); *B60L 15/2009* (2013.01);
(Continued)

(58) Field of Classification Search
CPC ....... B62D 59/04; B60D 1/62; B60L 15/2009; B60L 15/38; B60L 2200/28;
(Continued)

(56) References Cited

U.S. PATENT DOCUMENTS 6,516,925 B1 * 2/2003 Napier ................. B60T 8/1708
188/112 A
9,694,712 B2 7/2017 Healy
(Continued)

FOREIGN PATENT DOCUMENTS

CN    102656071 A    9/2012
CN    102658781 A    9/2012
(Continued)

OTHER PUBLICATIONS

Anonymous, "Road vehicles—Interchange of digital information on electrical connections between towing and towed vehicles—Part 2: Application layer for brakes and running gear," International Standard, ISO 11992-2, May 2014, pp. 1-89, ISO, Geneva, Switzerland.

Primary Examiner — Shardul D Patel
(74) Attorney, Agent, or Firm — LEYDIG, VOIT & MAYER, LTD.

(57) ABSTRACT

A method for controlling, via a trailer vehicle configured to be coupled to a towing vehicle with an electric drive, the electric drive of the towing vehicle includes receiving, via a trailer brake control unit of the trailer vehicle, a current accelerator pedal position from the towing vehicle. The method further includes generating a control signal for the electric drive with the trailer brake control unit depending on the received current accelerator pedal position and controlling the electric drive with the generated control signal.

16 Claims, 3 Drawing Sheets

(51) Int. Cl.
  *B60L 15/20* (2006.01)
  *B60L 15/38* (2006.01)
  *B60T 7/20* (2006.01)
  *B62D 59/04* (2006.01)

(52) U.S. Cl.
  CPC ............... *B60L 15/38* (2013.01); *B60T 7/20* (2013.01); *B60T 8/1708* (2013.01); *B60L 2200/28* (2013.01)

(58) Field of Classification Search
  CPC .... B60L 2200/36; B60L 2250/26; B60L 7/00; B60T 7/20; B60T 8/1708; B60T 2230/00; B60T 13/662; B60T 8/17; B60K 1/04; B60K 7/0007; B60K 2001/0444; B60Y 2400/61; B60Y 2200/147; Y02T 10/72
  USPC .......................................................... 701/70
  See application file for complete search history.

(56) References Cited

U.S. PATENT DOCUMENTS

| | | |
|---|---|---|
| 2006/0108956 A1 | 5/2006 | Clark et al. |
| 2012/0245796 A1* | 9/2012 | Yu .......................... B60D 1/245 |
| | | 701/41 |
| 2012/0283925 A1 | 11/2012 | Barlsen et al. |
| 2015/0060160 A1 | 3/2015 | Kerschl et al. |
| 2018/0086227 A1 | 3/2018 | Healy et al. |
| 2018/0304944 A1* | 10/2018 | Wright .................. B62D 53/08 |
| 2018/0334152 A1* | 11/2018 | Hunt ...................... B60T 8/171 |
| 2019/0389313 A1 | 12/2019 | Drewes |
| 2020/0244478 A1* | 7/2020 | Dieckmann .............. B60D 1/36 |

FOREIGN PATENT DOCUMENTS

| | | |
|---|---|---|
| DE | 102012223866 A1 | 7/2014 |
| DE | 102015222981 A1 | 5/2017 |
| DE | 102016123350 A1 | 6/2018 |
| EP | 1234739 A2 | 8/2002 |
| EP | 2394890 B1 | 5/2018 |
| EP | 2842814 B1 | 6/2018 |

* cited by examiner

TRAILER VEHICLE AND TRAILER BRAKE CONTROLLER, AND METHOD AND COMPUTER PROGRAM PRODUCT THEREFOR

CROSS-REFERENCE TO PRIOR APPLICATIONS

This application is a U.S. National Phase application under 35 U.S.C. § 371 of International Application No. PCT/EP2019/085469, filed on Dec. 17, 2019, and claims benefit to German Patent Application No. DE 10 2019 100 017.3, filed on Jan. 2, 2019. The International Application was published in German on Jul. 9, 2020 as WO 2020/141065 A1 under PCT Article 21(2).

FIELD

The present disclosure relates to the control of electric drives in trailer vehicles. A trailer vehicle is towed by a towing vehicle, which is, for example, a commercial vehicle. Such trailer vehicles towed by commercial vehicles, which are also referred to below as trailers for short, are in particular semi-trailers and drawbar trailers.

BACKGROUND

Commercial vehicles, which in addition to an internal combustion engine as the primary drive source also have at least one electric drive for support, are known. The electric drives are used in commercial vehicles, for example, in order to operate the internal combustion engine in an energy-efficient revolution rate range or to provide additional thrust, for example when driving off or driving uphill. In addition, with electric drives, kinetic and potential energy of the vehicle can be recovered and stored as electrical energy in one or more energy storage systems.

It is also known that trailers for commercial vehicles can also be equipped with an electric drive to provide an additional driving force for the commercial vehicle through the trailer, for example when driving uphill. For the control of an electric drive of the trailer vehicle, for example, a trailer vehicle having an electric drive which is coupled to a towing vehicle with a hybrid drive or a purely electric drive is known from document EP 2 842 814 B 1. The control of the electric drive of the trailer vehicle is carried out by coordinating the vehicle control unit of the towing vehicle and the additional energy management control unit in the trailer vehicle. Other documents, such as document EP 2 394 890 B1, describe solutions in which an electric drive of a trailer vehicle coupled to a towing vehicle is controlled by control signals generated by measuring the coupling force between the trailer vehicle and the towing vehicle. Also with regard to the control of an electric drive, fully autonomous trailer vehicles, in which the control signals for an electric drive of the trailer vehicle are obtained based on sensors for the determination of acceleration and inclination angle, are known from the document U.S. Pat. No. 9,694,712 B2, for example.

All these well-known solutions have in common that they have to be integrated into an existing system architecture, at least of the trailer vehicle. According to the above examples, therefore, additional control units or a complex additional sensor system must be integrated into the trailer vehicle, for example.

In addition, the described solutions have in common that these cannot be ideally integrated into the movement sequences of the trailer, so that on the one hand a non-optimal energy recovery is carried out during braking and, for example, due to independent driving condition detections of the towing vehicle on the one hand and of the trailer by the sensor system of the electric drive on the other hand, potential disruption of safety and stability systems can occur.

SUMMARY

In an embodiment, the present disclosure provides a method for controlling, via a trailer vehicle configured to be coupled to a towing vehicle with an electric drive, the electric drive of the towing vehicle. The method includes receiving, via a trailer brake control unit of the trailer vehicle, a current accelerator pedal position from the towing vehicle. The method further includes generating a control signal for the electric drive with the trailer brake control unit depending on the received current accelerator pedal position and controlling the electric drive with the generated control signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The prior art thus reveals that either a complete overhaul of the entire system of a towing vehicle and a trailer vehicle must be carried out in order to provide the trailer vehicle with a sufficient information basis about driving conditions from the trailer vehicle, for example by additional complex data transmission, or, if this additional integration effort in the towing vehicle is to be avoided, to provide a complex additional sensor system in the trailer vehicle, which may nevertheless lead to the above-mentioned problems, namely to potential disruption of safety and stability systems.

The present disclosure describes improved integration of an electric drive into a trailer vehicle, so that an electric drive with a high efficiency can be incorporated in as many arbitrary driving situations as possible and is thus easily integrated into an existing control structure without providing a complex additional sensor system or additional control modules in the trailer vehicle.

A method is proposed for a trailer vehicle which can be coupled to a towing vehicle. The method is used for trailer vehicles with an electric drive for controlling the electric drive. Here, a current accelerator pedal position is first received from a towing vehicle with a trailer brake control unit of the trailer vehicle. In addition, a control signal for the electric drive is generated with the trailer brake control unit depending on the received current accelerator pedal position. The electric drive is then controlled with the current control signal.

Therefore, a trailer brake control unit of the trailer vehicle is used to generate a control signal for the electric drive of the trailer vehicle. Here it is particularly advantageous that the trailer brake control unit already has available a sufficient amount of information about the current condition or driving condition of the trailer vehicle. For example, according to the prior art it is known that axle loads of the axles of the trailer vehicle, acceleration in the longitudinal direction, wheel speeds of at least two sensed wheels of the trailer and/or the absolute speed of the vehicle are available. By additionally receiving a current accelerator pedal position of the accelerator pedal of the towing vehicle, which is towing the trailer vehicle, a positive acceleration request can thus additionally be derived in a simple manner, namely a desired positive acceleration, and depending on this derived acceleration request a control signal for controlling the electric drive can be generated and output. For integration, therefore, the trailer brake control unit only has to be informed additionally of the current accelerator pedal position of the towing vehicle. The current accelerator pedal position is therefore so far not transferred from the towing vehicle to a trailer brake control unit in existing systems, so that the essential cost for the integration of control of the electric drive is to be seen in this additional transmission. If the accelerator pedal position is known, the existing trailer brake control unit may be supplemented in a simple manner by the function of generating a control signal.

Accordingly, a simple implementation of the control of the electric drive of a trailer vehicle is made possible, wherein it is taken into account at the same time that control signals can be produced with a trailer brake control unit in an appropriate manner to ensure disruption-free safety and stability of the trailer vehicle.

According to a first embodiment, a charge state, also called a state of charge (SoC), of at least one accumulator of the electric drive is detected by the trailer brake control unit. The control signal is then generated with the trailer brake control unit depending on the accelerator pedal position and the detected state of charge. Preferably, a measurement of the state of charge of one or more accumulators of the electric drive is already provided in the electric drive. The result of this measurement is preferably also provided by known electric drives via a CAN interface and can be called up in a simple manner and thus captured via a CAN connection between the electric drive and the trailer brake control unit.

By taking into account the state of charge of the accumulator, it is therefore possible to take into account the extent to which an electric drive can make a contribution during acceleration, namely based on an available electrical energy reserve in the at least one accumulator. For example, if the accumulator is completely discharged, then accordingly no additional torque can be generated with an electric drive even for an accelerator pedal position that signals a high need for acceleration, so that according to the embodiment a control signal for the electric drive is also preferably generated by the trailer brake control unit, which takes into account this discharged state of the accumulator, and thus controls the electric drive in such a way that it does not supply additional torque.

According to a further embodiment, the current speed of the trailer vehicle is detected or provided by the trailer brake control unit. In this case, preferably the current speed of the trailer is provided to the brake control unit, which is connected to a vehicle control unit of the towing vehicle, which is towing the vehicle trailer, via a standardized data connection, namely in particular according to ISO 11992-2. The trailer brake control unit is thus provided with the current speed for generating the control signal. In addition or alternatively, the current speed is detected by revolution rate sensors of the trailer brake control unit for determining the revolution rate of the wheels of the trailer vehicle.

Furthermore, using a torque characteristic curve, which is preferably stored in the trailer brake control unit or in a controller of the electric drive and comprises the speed-dependent maximum torque values, depending on the provided or detected current speed, a current maximum torque value is determined. According to this, a torque characteristic curve is provided, which associates a respective maximum torque value of the electric drive with different speed values, for example in the range from 0 to 100 or up to 150 km/h. This maximum torque value is, for example, a preferred value at the current speed, which can be generated without the electric drive operating outside predetermined operating limits and with an efficiency above a specified threshold. Thus, a maximum torque value can be determined for each current speed of the vehicle.

Here the term a torque characteristic curve is used as a proxy for an established predefined relationship between maximum torque values and speed values. Instead of a torque characteristic curve, a table or a function that establishes a corresponding relationship can also be stored or provided.

In addition, the control signal is generated depending on the current accelerator pedal position and the maximum torque. This is carried out for example by deriving a relative accelerator pedal position from the current accelerator pedal position. Preferably, the current accelerator pedal position already corresponds to a relative value of an accelerator pedal position, wherein it may also be provided that the current accelerator pedal position is represented, for example, by absolute values and must therefore be converted into a relative accelerator pedal position. The relative accelerator pedal position then corresponds, for example, to a percentage value and a control torque value is determined, which corresponds to the percentage of the determined maximum torque value. Thus a relative accelerator pedal position, thus, for example, a value of the accelerator pedal position between 0 and 100 percent, will be derived from the current accelerator pedal position or, if the current accelerator pedal position is for example already a relative value, for example in the range of 0 to 100 percent, was received from the trailer brake control unit, wherein the relative value is used to determine a control torque value, which corresponds to the percentage of the accelerator pedal position at the currently determined maximum torque value.

Depending on the speed, a maximum torque value of the electric drive is first detected, and a control torque is generated depending on the accelerator pedal position. This specified or determined control torque is then used by the trailer brake control unit to generate the control signal for the electric drive.

For this purpose, the control torque value, or an adapted control torque value derived from the control torque value, i.e. dependent on the control torque value, is output as a control signal to the electric drive. Thus, the control signal for the electric drive can be generated as a torque value in a simple way.

According to a further embodiment, a state of charge is detected of at least one accumulator of the electric drive of the trailer vehicle with the trailer brake control unit. Detecting the state of charge of the accumulator also includes receiving a signal indicating the state of charge of the accumulator. Accordingly, for example, a measurement, for example, of the voltage of the accumulator, which is a function of the state of charge, is already provided in the electric drive and this voltage value or a derived state of charge is transmitted to the trailer brake control unit, for example via a bus connection between the trailer brake control unit and the electric drive. Detection then involves receiving the state of charge or receiving the voltage of the accumulator and deriving the state of charge from the received voltage. According to this embodiment, a previously determined control torque value is then adjusted depending on the state of charge and output as a control signal to the electric drive.

Accordingly, the control torque value is not output directly as a control signal as in the previous embodiment, but the control torque value is adjusted so as to take into account the state of charge of the accumulator of the electric drive. The adjusted control torque value is then output as a control signal to the electric drive of the trailer vehicle. Here it can be taken into account that, for example, with a high charge of the accumulator and thus much available energy, for example, a comparatively higher control torque value can be output as a control signal, so that the electric drive can contribute comparatively more to a total desired acceleration of a combination vehicle consisting of a towing vehicle and a trailer vehicle. For example, this is carried out although the electric drive is no longer operating in the ideal efficiency range at such a high torque value, but it is useful, for example, to discharge the accumulator in order to have sufficient free capacity for a later braking process, which may be imminent. On the other hand, it is also possible to adjust a control torque value if the state of charge of the accumulator is low, since there is thus no risk of a complete discharge of the accumulator by controlling the electric drive and generating positive acceleration energy.

According to a further embodiment, the adjustment of the torque value is carried out in such a way that the control torque value is increased in the event that the state of charge is above a predefined threshold value or threshold value range. In this case, the control torque value is increased, for example, by a predefined value or a predefined relative value of the control torque value. In the event that the state of charge is below a predefined threshold value or threshold value range, the control torque value is reduced. Also the reduction of the control torque value is carried out, for example, by the or a further predefined value or the or a further predefined relative value of the control torque value. According to the embodiment, a threshold value or threshold value range is therefore provided, which is preferably predefined in such a way that it corresponds to or comprises a state of charge at which the at least one accumulator essentially has the rated voltage of the electric drive. Preferably, since when designing the electric drive an accumulator is usually adapted in respect of its voltage to a rated voltage of electric motors of the electric drive which are to be supplied, for example, a threshold value range of 40 to 60 percent of the total charge is suitable to form the threshold value range.

According to a further embodiment, the generation of a control signal depending on the received current accelerator pedal position includes that a currently expected accelerator pedal position of the towing vehicle is determined depending on the current condition of the towing vehicle and/or trailer vehicle. The received current accelerator pedal position is then compared with the expected accelerator pedal position in order to obtain a comparison result. The control torque value is then additionally generated depending on the comparison result and output as a control signal for the electric drive. A current condition of the trailer vehicle includes, for example, a vehicle mass, a load distribution or loading of the trailer vehicle, which is known in the trailer brake control unit. Furthermore, the condition of the trailer vehicle preferably includes the vehicle speed and vehicle acceleration of the trailer vehicle, which are also known to the trailer brake control unit. Thus, depending on these values which are already known in the trailer brake control unit, the expected accelerator pedal position can be compared with the current received accelerator pedal position.

By comparison, i.e. depending on the comparison result, it emerges that, for example, if the received current accelerator pedal position is above an expected current accelerator pedal position, which is assigned to a current speed, and the vehicle does not accelerate or even slow down, the vehicle is driving uphill. If, for example, the recommended accelerator pedal position is at or below the expected accelerator pedal position and the vehicle accelerates or maintains the speed, this indicates a descent. If the received accelerator pedal position is above the expected accelerator pedal position and the vehicle accelerates, it can be inferred that a driver's wish is that a positive acceleration of the vehicle should take place. If, on the other hand, the received accelerator pedal position corresponds to the expected accelerator pedal position, straight-ahead travelling at constant speed is to be assumed. The comparison result therefore indicates the driving condition of the vehicle combination.

Thus, again, from the result of comparing the received accelerator pedal position with the expected accelerator pedal position, which therefore, for example, reflects a driving condition, it can be inferred that a hill ascent, a hill descent, a positive acceleration or straight-ahead travel at a constant speed is occurring and the electric drive is switched on, for example, if its efficiency is comparatively much higher than the efficiency of an internal combustion engine. This is particularly the case in driving conditions such as a vehicle acceleration and a hill ascent. It should be noted that the electric drive in the trailer vehicle has a higher efficiency than a combustion engine, except in exceptional situations. Here it is the aim to identify from the known efficiency characteristic of the combustion engine in certain driving situations, situations in which the difference in efficiency of the combustion engine from the electric drive is particularly large, wherein the desired propulsion power should therefore be particularly advantageously taken in part from the electric drive.

According to a further embodiment, the determination of a currently expected accelerator pedal position of the towing vehicle in the trailer brake control unit is carried out depending on an accelerator pedal position characteristic curve, which indicates an expected accelerator pedal position depending on a current speed of the vehicle. The accelerator pedal position characteristic is stored, for example, in the trailer brake control unit. Thus, an expected accelerator pedal position can be determined by the trailer brake control unit in a simple and especially fast manner. As before, a characteristic curve is also referred to here, wherein a table or a function may also be provided, so the term "accelerator pedal position characteristic curve" is also understood as an accelerator pedal position table, which associates expected accelerator pedal position values with current speed values, or as an accelerator pedal position function, which indicates an expected accelerator pedal position depending on a current speed.

According to a further embodiment, the accelerator pedal position characteristic curve is adjusted in the trailer vehicle control unit depending on further conditions of the trailer vehicle, in particular the current weight of the trailer vehicle. It is therefore taken into account that the mass of a towing vehicle is essentially constant, whereas a trailer vehicle can have different total masses depending on the load. This has an influence on the required drive power, which is comparatively increased at constant speed. Thus, a comparatively changed accelerator pedal position is to be expected if there is a comparatively different mass of the trailer vehicle. This is ensured by adjusting the accelerator pedal position characteristic curve to the conditions of the trailer vehicle, namely here the current weight or the current mass.

For the purposes of clarifying the terminology, a distinction must be made between the current condition of the trailer vehicle, which includes, for example, the current speed, the mass, the load distribution and the like, whereas a driving condition, on the other hand, includes an ascent, a descent, a positive acceleration request, a negative acceleration request and normal straight-ahead travel.

According to a further embodiment, the control torque value is calculated according to the following formula:

$$M^* = \frac{100\%}{100\% - A^*} \cdot (A - A^*) \cdot M_{max}(S1, v)$$

In this formula, A denotes the accelerator pedal position, whereas A* denotes the expected accelerator pedal position. The value $M_{max}(S1, v)$ denotes the maximum torque of the electric drive as a function of the current speed. This then results in the control torque value M*, which is changed, for example, depending on the state of charge.

In a simple way, therefore, when determining the control signal, which, for example, specifies a target torque value for the electric drive, driving states, the possible torque of the electric drive and possibly the state of charge of the accumulator of the drive are taken into account. In particular, it also occurs that the electric drive is not only predominantly used for propulsion when this is energy-efficient, but the assisting power also directly depends on the absolute level of the change in the vehicle movement requested by a driver. In the case of an ascent, in particular if the received accelerator pedal position is below the expected accelerator pedal position, the formula mentioned leads to a negative moment. In this case, the actual controlled moment, i.e. the control signal, is set to 0.

According to a further embodiment, the accelerator pedal position is received by the trailer brake control unit via a CAN bus, namely a CAN bus according to ISO 11992-2. Here, the accelerator pedal position is preferably transmitted with the message EBS 11. This message, with which the accelerator pedal position is received, preferably includes a relative value of an accelerator pedal position. According to ISO 11992-2, a data exchange between the vehicle control unit of the towing vehicle and the trailer brake control unit of the trailer vehicle via a CAN connection is provided anyway. In particular, the message EBS 11, which includes the signal "Retarder Demand Value", has not been used so far. This has a range of values ranging from −125 to 125 percent. It is proposed to use the accelerator pedal position in percent directly as a signal in the positive value range of the message, so that only the value range from 0 to 100 percent should be used. The negative value range can be used for vehicle deceleration by the electric drive in the trailer, for example.

In particular, this value of the accelerator pedal position is not output directly as an actual accelerator pedal position by the vehicle brake control unit of the towing vehicle but is additionally adapted to information known in the vehicle brake control unit of the towing vehicle, for example, about the steering angle and preferably in conjunction with also known geometry information of the vehicle combination, namely a current articulation angle between the towing vehicle and the trailer vehicle. For example, if an articulation angle between the towing vehicle and the trailer vehicle exceeds a value at which a thrust operation of the trailer vehicle would lead to an undesirable articulation of the trailer vehicle, the value 0 percent will be transferred regardless of the actual accelerator pedal position. Thus, the method can be implemented without a further data line or data connection with only any additional adjustment of the vehicle brake control unit of the towing vehicle, namely such that this sends an accelerator pedal position value via the message EBS 11 as an the already provided CAN communication via ISO11992-2, which is standardized via an ISO 7638 interface, namely a brake CAN bus.

According to one embodiment, the control signal for the electric drive is also output from the trailer brake control unit via the ISO 11992-2 CAN bus and is preferably received by the vehicle brake control unit of the towing vehicle. For example, the absolute value of the control signal is transmitted in the message 23 and additionally or alternatively a relative value of the control signal is transmitted in the message 21. In this way, the vehicle brake control unit of the towing vehicle may take into account the additional thrust provided by the trailer vehicle. Accordingly, the vehicle brake control unit of the towing vehicle can generate a request signal for a vehicle control unit of the towing vehicle by means of the control signal.

In addition, a vehicle brake control unit for a towing vehicle is provided for carrying out the method and a trailer brake control unit for a trailer vehicle for carrying out the method according to one of the above-mentioned embodiments. The vehicle brake control unit is, for example, set up to output an accelerator pedal position by means of an ISO 11992-2 CAN bus, wherein this is in particular caried out in the message EBS 11. Moreover, the vehicle brake control unit is set up to receive a control signal for controlling an electric drive of a trailer vehicle capable of being coupled to the towing vehicle from the trailer vehicle. The control signal has, for example, a control torque value or an adjusted control torque value and is preferably received from the trailer brake control unit via the ISO 11992-2 CAN bus, in particular in the message 21 and/or the message 23.

According to one embodiment of the vehicle brake control unit, this is set up to output a request signal for a vehicle control unit of the towing vehicle depending on the control signal which can be received from the trailer brake control unit. The vehicle brake control unit of the towing vehicle may use this information to send a corresponding request to the drive of the towing vehicle for an equivalent reduction of its controlled torque by means of a current, preferably positive, torque of the electric drive of the trailer vehicle. This is also called acceleration blending. Alternatively, the torque of the drive of the towing vehicle cannot be influenced by controlling a torque in the trailer, which is called acceleration boost.

The trailer brake control unit is set up to perform a method according to one of the above-mentioned embodiments. In this case, the trailer vehicle is set up in particular to receive an accelerator pedal position from a towing vehicle and to generate a control signal, which comprises, for example, a control torque value or an adjusted control torque value, depending on the received accelerator pedal position and to output this to an electric drive.

Furthermore, a vehicle with the vehicle brake control unit or a trailer brake control unit, namely a towing vehicle or a trailer vehicle, is disclosed herein. In addition, a computer program product, namely software, which performs the method according to one of the above-mentioned embodiments when it is carried out on a trailer brake control unit, is also disclosed herein.

Figure 1:
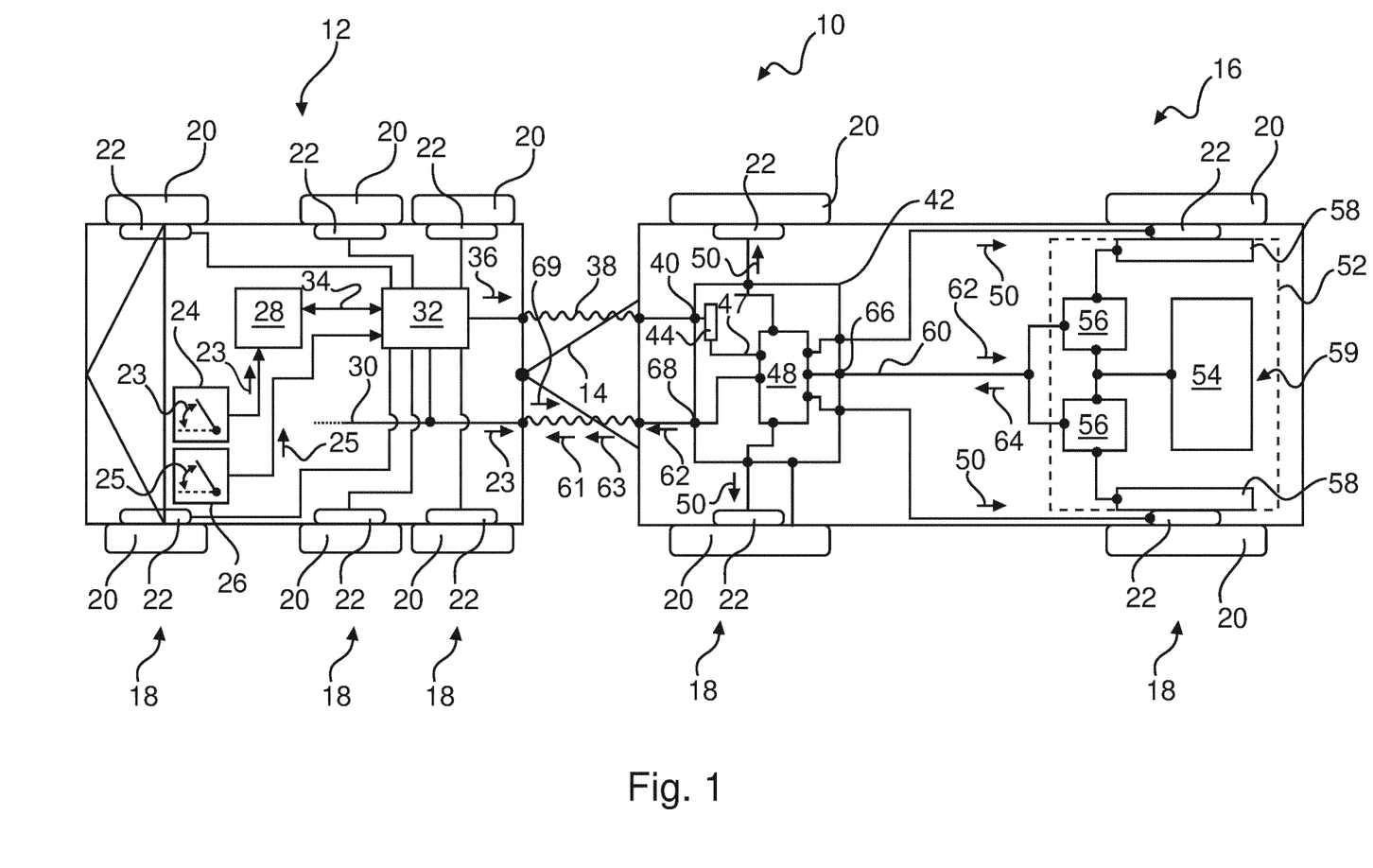
FIG. 1 shows a vehicle combination.

FIG. 1 shows a vehicle combination 10, comprising a towing vehicle 12, which is for example a commercial vehicle and which is connected to a trailer vehicle 16 via a drawbar 14. The trailer vehicle 16 can thus be towed by the towing vehicle 12. The towing vehicle 12 and the trailer vehicle 16 each comprise several axles 18, each with two wheels 20. Each of the wheels 20 is equipped with a friction brake 22 to brake the wheels 20 in the event of a request for negative acceleration. At least one of the axles 18 of the towing vehicle 12 is driven by an internal combustion engine or an electric drive, wherein neither the internal combustion engine nor the electric drive is shown in FIG. 1 for better clarity.

For driving the towing vehicle 12 a request to increase speed or a braking request is signaled by a variation of an accelerator pedal position 23 of an accelerator pedal 24 and by variation of a brake pedal position 25 of a brake pedal 26 by an operator of the towing vehicle 12. The accelerator pedal 24 is connected to a vehicle control unit 28 for transmitting the accelerator pedal position 23. The brake pedal 26 is connected to a vehicle brake control unit 32 for transmitting the brake pedal position 25. The vehicle control unit 28 transmits control signals for controlling the drive, which is not shown, on a bus which is not shown and which is connected to the vehicle control unit 28. The vehicle control unit 28 transmits the accelerator pedal position 23 on to the vehicle brake control unit 32 via a connection 34. The vehicle brake control unit 32 outputs the accelerator pedal position 23 in a message, in particular the message EBS 11, on a bus 30 which is standardized in accordance with ISO 11992.

In addition, the friction brakes 22 of the towing vehicle 12 are connected to the vehicle brake control unit 32, so that in the case of a braking request triggered by the brake pedal 26, this can be converted into braking signals for the friction brakes 22 of the towing vehicle 12.

In addition, in the event of a braking request, the vehicle brake control unit 32 of the towing vehicle 12 generates a negative acceleration signal for the trailer vehicle 16 on the one hand, which is transmitted via the bus 30 to the trailer brake control unit 42, and on the other hand a brake control pressure 36, which is also transmitted to the trailer vehicle 16 via a brake control line 38 as a negative acceleration request signal. The transmission of the negative acceleration request signal via the brake control line 38 is to be seen as a redundant transmission path. In the normal state, therefore, a target value of the acceleration request signal over the bus 30 is used for the control of the friction brakes 22 of the trailer vehicle 16 by the trailer brake control unit 42. In the event of a failure of the bus signal, the acceleration request signal is received via the brake control line 38. The brake control line 38 is connected to a first input 40 of a trailer brake control unit 42 for this purpose. A sensor 44 of the trailer brake control unit 42 converts the brake control pressure 36, which is transmitted via the brake control line 38, into an electric signal 47 and transmits this to a controller 48 of the trailer brake control unit 42. Depending on this signal 47, friction brakes 22 of the two axles 18 represented here of the trailer vehicle 16 can be controlled. Thus signals, namely brake control signals 50, are output to control the friction brakes 22 depending on the brake control pressure 36, which is fed via the brake control line 38 to the trailer brake control unit 42 as an acceleration request signal.

In addition, the trailer vehicle 16 has an electric drive 52, which includes an accumulator 54, which is rechargeable. In addition to the accumulator 54, the electric drive comprises two converters 56, which supply electric motors 58 with the energy of the accumulator 58 to produce a positive torque. The accumulator 54, the inverters 56 and the electric motors 58 correspond to components 59 of the electric drive 52. According to an alternative exemplary embodiment which is not shown here, only one electric motor 58 is provided for the drive of both wheels 20 of the axle 18, which distributes the driving force to the wheels 20 via a differential gearbox. In the case in which only one electric motor 58 is provided, the electric drive 52 includes only one inverter 56.

The electric motors 58 can also be operated in the generator mode, so that electrical energy is fed back into the accumulator 54 via the inverter 56. Preferably, this generator mode is requested by the vehicle brake control unit 32 of the towing vehicle 12 via the trailer brake control unit 42, if a driver braking request is made. Accordingly, it may be provided that the use of friction brakes 22, as described above, takes place only if requested braking by the electric drive 52 is not sufficient to implement the braking request. For controlling the electric drive 52, namely the inverter 56, the electric drive 52 is connected to the trailer brake control unit 42 via another bus 60.

Control of the inverter 56 specifies on the one hand whether the electric motors 58 should be operated in generator mode or in motor mode and the torque which is to be used here. In the case of the operation of the electric motors 58 in motor mode a positive torque is referred to, while the torque, i.e. a value of the torque, in the generator operation of the electric motors 58 is referred to as negative torque. For controlling the electric drive 52, namely in particular the inverter 56, a control signal 62 is sent to the electric drive 52 by the trailer brake control unit 42 via the bus 60. In addition, the electric drive 52 sends a state of charge 64 to the trailer brake control unit 42, in order to be able to communicate to the trailer brake control unit 42, for example or inter alia, the currently available amount of charge or electrical charge which is available to the capacity of the accumulator 54, for example as an absolute value, for example in ampere hours, or as a relative value, for example without a unit.

The trailer brake control unit 42 is also set up, depending on the state of charge 64 and the received accelerator pedal position 23, to generate the control signal 62 and to output this via an interface 66 of the bus 30, with which the state of charge 64 is also received.

The trailer brake control unit 42 is connected accordingly to the bus 30 via a further input 68 in order to receive the accelerator pedal position 23. As explained above, the bus 30 corresponds to a CAN bus and the input 68 corresponds to an interface for the CAN bus. Accordingly, in addition to receiving the accelerator pedal position 23 with the trailer brake control unit 42, it is also possible to transfer the control signal 62 to the vehicle brake control unit 32 of the towing vehicle 12. This is done, for example, as a relative value 61 or as an absolute value 63 of a control torque value of the control signal 62. Furthermore, the current speed 69 will be transmitted over the bus 30.

Figure 2:
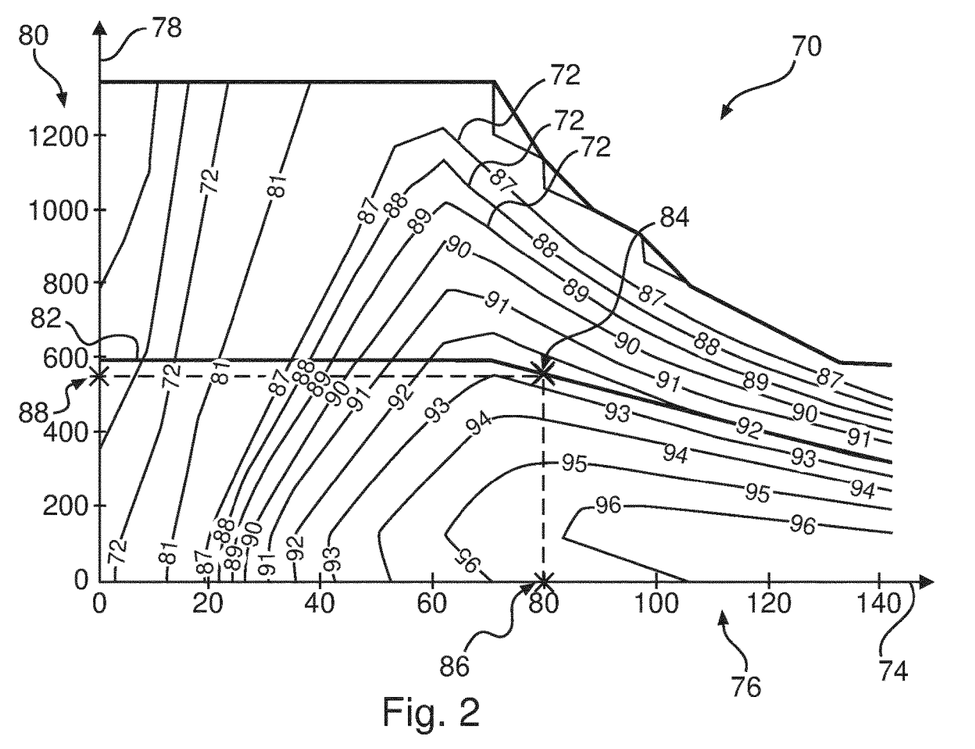
FIG. 2 shows an efficiency characteristic diagram.

FIG. 2 shows an efficiency characteristic diagram 70 of the electric motor or motors 58 of the electric drive 52. The efficiency characteristic diagram 70 indicates the efficiency range with contour lines 72 for a vehicle speed 76 plotted along a horizontal axis 74 and torque values 80 plotted along a vertical axis 78. Based on the efficiency characteristic diagram 70, a torque characteristic curve 82 is predetermined, which was determined so that it specifies maximum torque values 84 of the electric drive 52, namely of its electric motors 58, depending on the speed 76 at which the electric drive 52 can be operated advantageously, for example with nominal power. The torque characteristic curve 82 thus associates an exemplary maximum torque value 84 at an effective speed 86 of 80 kilometers per hour with the maximum torque 88 of about 570 Newton meters. The torque characteristic curve 82 can be and is also considered below as an S1 characteristic curve. A maximum torque value of 84 therefore corresponds to the torque value 88, which lies at a speed 86 on the torque characteristic curve 82, namely the S1 characteristic curve. Accordingly, the maximum torque value 84 is determined according to $M_{max}(S1, v)$.

Figure 3:
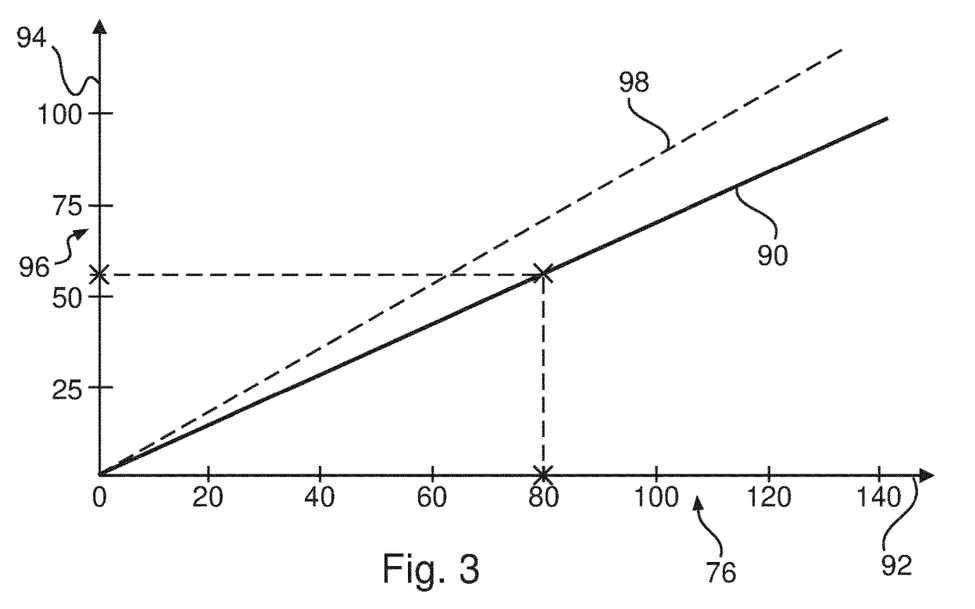
FIG. 3 shows an accelerator pedal position characteristic curve.

Furthermore FIG. 3 shows an accelerator pedal position characteristic curve 90, which associates each speed value 76 shown on the horizontal axis 92 with a percentage value of an accelerator pedal position shown on the vertical axis 94. The accelerator pedal position characteristic curve 90 thus associates each speed 76 of the vehicle with an expected accelerator pedal position 96, which is expected for constant straight-ahead travel on a flat stretch. The accelerator pedal position characteristic curve 90 is, for example, also stored in the trailer brake control unit 42 and is adapted by the trailer brake control unit 42 depending on a mass, which changes by loading the trailer vehicle 16, for example. Here, for example, a steeper profile for a comparatively higher mass is represented by the dashed line 98.

Figure 4:
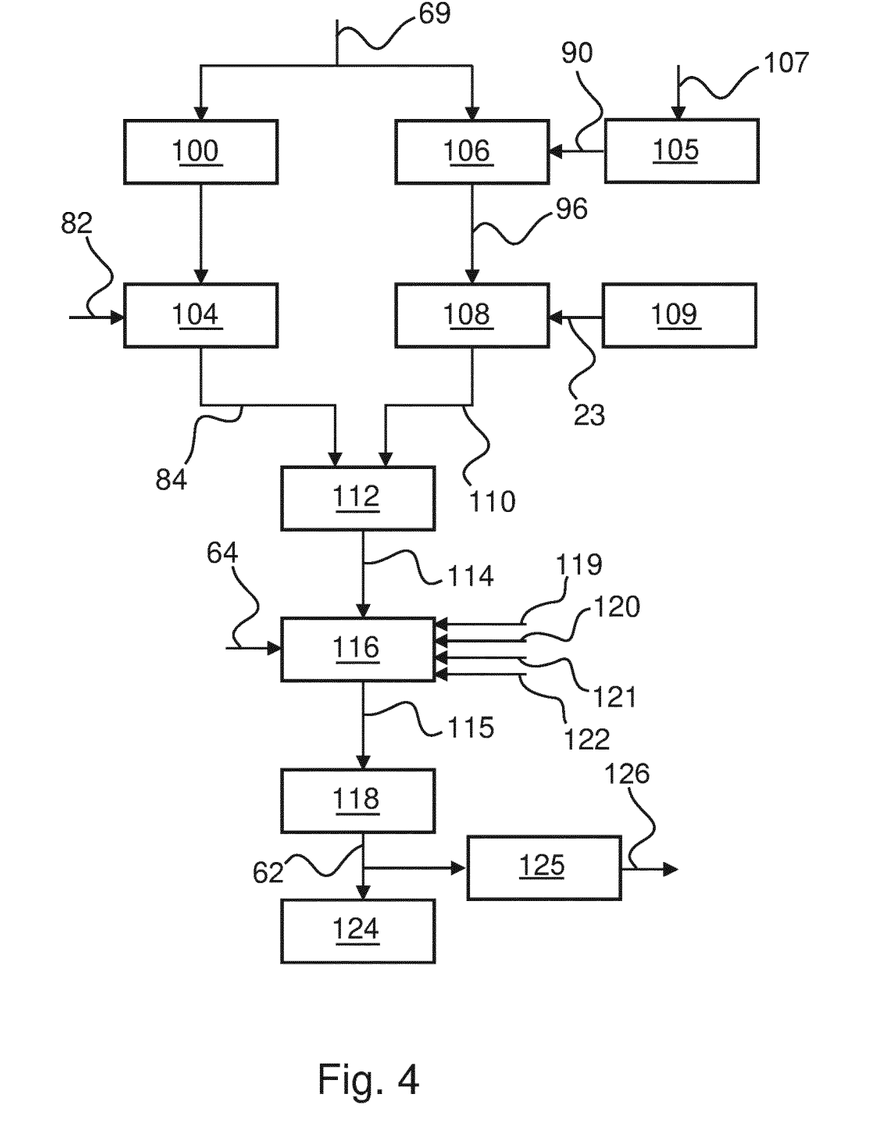
FIG. 4 shows the steps of a method.

Thus, into account the efficiency characteristic diagram 70, but at least the torque characteristic curve 82 and the accelerator pedal position characteristic curve 90, which are stored in the trailer brake control unit 42, the method according to the steps as shown in FIG. 4 results.

FIG. 4 therefore shows the steps of an exemplary embodiment of the method. Thus, step 100 shows that a current speed 69 is first determined or detected. In step 104, a maximum torque value 84 is then determined on the basis of the current speed 69 and a torque characteristic curve 82. In addition, in a step 106 in parallel an expected accelerator pedal position 96 is determined based on the current speed 69 by means of an accelerator pedal position characteristic curve 90. The accelerator pedal position characteristic curve 90 is previously determined in a step 105 depending on conditions 107 of the trailer vehicle 16, such as the current mass of the trailer vehicle 16, or a stored accelerator pedal position characteristic curve 90 is adjusted. The expected accelerator pedal position 96 is compared in a step 108 with an accelerator pedal position 23 received in a step 109. For example, the comparison is carried out according to the following formula:

$$\frac{100\%}{100\% - A^*} \cdot (A - A^*).$$

Here, A is the received accelerator pedal position 23, whereas A* is the expected accelerator pedal position 96. The comparison result 110 is then fed to a step 112 along with the maximum torque value 84 and these are set in relation to reach other, for example by multiplication with each other, so that a control torque value 114 is output from the step 112. In a subsequent step 116, the state of charge 64 of an accumulator 54 of the electric drive 52 is used to adjust the control torque value 114. For this purpose, a threshold value 119 or threshold value range 120 and a predefined value 121 and a predefined relative value 122 are supplied. The adjusted control torque value 115 is output in a step 118 as a control signal 62. The control signal 62 comprises a torque value for this purpose, for example, which is fed to the inverter 56 or the inverters 56 of the electric drive 52 and these are controlled in step 124. The control signal 62 is also output to a vehicle control unit 32 of the towing vehicle 12, which generates from this and outputs a request signal 126 for the vehicle control unit 28 in a step 125.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

10 Vehicle combination
12 Towing vehicle
14 Drawbar
16 Trailer vehicle
18 Axles
20 Wheels
22 Friction brake
23 Accelerator pedal position
24 Accelerator pedal
25 Brake pedal position
26 Brake pedal
28 Vehicle control unit
30 Bus
32 Vehicle brake control unit
34 Direct connection
36 Brake control pressure
38 Brake control line
40 First input
42 Trailer brake control unit
44 Sensor 47 Electric signal
48 Controller
50 Brake control signal
52 Electric drive
54 Accumulator
56 Inverters
58 Electric motors
59 Component
60 Further bus
61 Relative value
62 Control signal
63 Absolute value
64 State of charge
66 Interface
68 Further input
69 Current speed
70 Efficiency characteristic diagram
72 Contour lines
74 Horizontal axis
76 Vehicle speed
78 Vertical axis
80 Torque values
82 Torque characteristic curve
84 Maximum torque value
86 Current speed
88 Maximum torque
90 Accelerator pedal characteristic curve
92 Horizontal axis
94 Vertical axis
96 Expected accelerator pedal position
98 Dashed line
100 Step of the method
104-106 Steps of the method
107 Conditions of the trailer vehicle
108, 109 Steps of the method
110 Comparison result
112 Step of the method
114 Control torque value
115 Adjusted control torque value
116-118 Steps of the method
119 Threshold value
120 Threshold value range
121 Predefined value
122 Predefined relative value
124, 125 Steps of the method
126 Request signal

The invention claimed is:

1. A method for controlling, via a trailer vehicle configured to be coupled to a towing vehicle, an electric drive of the trailer vehicle, the method comprising: receiving, via a trailer brake control unit of the trailer vehicle configured to control friction brakes of the trailer vehicle, a current accelerator pedal position from the towing vehicle, generating a control signal for the electric drive of the trailer vehicle with the trailer brake control unit depending on the received current accelerator pedal position, and controlling the electric drive with the control signal generated by the trailer brake control unit, wherein the current accelerator pedal position is received via an ISO 11992-2 CAN bus in message EBS 11 according to ISO 11992-2, and wherein the control signal is output via the ISO 11992-2 CAN bus to a vehicle brake control unit of the towing vehicle, the control signal being output in message (21) according to ISO 11992-2 as a relative value and/or message (23) according to ISO 11992-2 as an absolute value, and wherein a request signal for a vehicle control unit is generated in the vehicle brake control unit as a function of the generated control signal.

2. The method as claimed in claim 1, further comprising detecting a state of charge of at least one accumulator of the electric drive by the trailer brake control unit, wherein the control signal for the electric drive is generated with the trailer brake control unit depending on the received accelerator pedal position and further depending on the detected state of charge.

3. The method as claimed in claim 1, wherein the generating the control signal includes:
   detecting or providing a current speed of the trailer vehicle in the trailer brake control unit,
   determining a maximum torque value of the electric drive using a torque characteristic curve with speed-dependent maximum torque values and the detected or provided current speed,
   determining a control torque value depending on the accelerator pedal position and the determined maximum torque value, and
   outputting, to the electric drive as the generated control signal, the determined control torque value or a control torque value adjusted depending on the determined control torque value.

4. The method as claimed in claim 3, wherein a state of charge of an accumulator of the electric drive is detected by the trailer brake control unit, and wherein the control torque value generated by the trailer brake control unit is adjusted depending on the detected state of charge, and wherein the adjusted control torque value is output, to the electric drive, as the generated control signal.

5. The method as claimed in claim 4, wherein the control torque value is adjusted such that:
   in response to the state of charge of the at least one accumulator being above a predefined threshold value or threshold value range, the control torque value is increased by a predefined value or a predefined relative value of the control torque value, or
   in response to the state of charge of the at least one accumulator being below the predefined threshold value or threshold value range, the control torque value is reduced by the or another predefined value or the or another predefined relative value of the control torque value.

6. The method as claimed in claim 1, wherein generating the control signal includes:
   determining a currently expected accelerator pedal position of the towing vehicle of the trailer vehicle,
   comparing the received current accelerator pedal position with the expected accelerator pedal position to determine a comparison value, and
   generating the control torque value as the control signal for the electric drive additionally depending on the comparison result.

7. The method as claimed in claim 6, wherein the determination of a currently expected accelerator pedal position of the towing vehicle is dependent on an accelerator pedal position characteristic curve that indicates an expected accelerator pedal position depending on a current speed of the trailer vehicle.

8. The method as claimed in claim 7, wherein the accelerator pedal position characteristic curve is adjusted depending on further conditions of the vehicle or the trailer vehicle.

9. The method as claimed in claim 1, wherein the control torque value is determined by:

$$M^* = \frac{100\%}{100\% - A^*} \cdot (A - A^*) \cdot M_{max}(S1, v),$$

wherein

M* is the determined control torque value, A* corresponds to the expected accelerator pedal position, A corresponds to the received accelerator pedal position and $M_{max}(S1, v)$ corresponds to the maximum torque value depending on the current speed.

10. A trailer brake control unit for a trailer vehicle, wherein the trailer brake control unit is configured to carry out a method as claimed in claim 1.

11. A vehicle with a trailer brake control unit as claimed in claim 10.

12. A non-transitory computer-readable medium having processor-executable instructions stored thereon, wherein the processor-executable instructions, when executed by one or more processors, facilitate performance of the method of claim 1.

13. The method according to claim 1, wherein the trailer brake control unit includes a sensor configured to convert a brake control pressure received from the towing vehicle into an electric signal.

14. The method according to claim 13, further comprising:
 determining, via the trailer brake control unit, that transmission of a negative acceleration signal from the towing vehicle to the trailer brake control unit has failed; and
 controlling the friction brakes of the trailer vehicle based on the brake control pressure.

15. A vehicle brake control unit for a towing vehicle, wherein the vehicle brake control unit is configured to output an accelerator pedal position via an ISO 11992-2 CAN bus in message EBS 11 according to ISO 11992-2, and to receive a control signal output in message (21) and/or message (23) according to ISO 11992-2, from a trailer brake control unit, for controlling an electric drive of a trailer vehicle, which is configured to be coupled to the towing vehicle via the ISO 11992-2 CAN bus.

16. The vehicle brake control unit as claimed in claim 15, wherein the vehicle brake control unit is configured to, depending on the control signal, output a request signal for a vehicle control unit of the towing vehicle.

* * * * *